(12) United States Patent
Hinkle

(10) Patent No.: US 12,511,632 B2
(45) Date of Patent: Dec. 30, 2025

(54) RECONFIGURING SELF-CHECKOUT KIOSKS BASED ON ATTENDANT AVAILABILITY

(71) Applicant: Toshiba Global Commerce Solutions, Inc., Durham, NC (US)

(72) Inventor: Johanna E. Hinkle, South Bend, IN (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 347 days.

(21) Appl. No.: 18/162,665

(22) Filed: Jan. 31, 2023

(65) Prior Publication Data

US 2024/0257088 A1    Aug. 1, 2024

(51) Int. Cl.
 G06Q 20/20    (2012.01)
 G06Q 20/18    (2012.01)

(52) U.S. Cl.
 CPC ........... *G06Q 20/18* (2013.01); *G06Q 20/206* (2013.01)

(58) Field of Classification Search
 CPC .... G06Q 20/18; G06Q 20/206; G06Q 20/202; G07G 1/0009; G07G 1/0036; G07G 1/0045; G07G 1/0054; G07G 1/0063; G07G 1/14
 See application file for complete search history.

(56) References Cited

U.S. PATENT DOCUMENTS

| | | | | |
|---|---|---|---|---|
| 7,866,546 B1 * | 1/2011 | Vance | ................... | G07G 1/0009 235/383 |
| 9,454,757 B2 * | 9/2016 | Edwards | .............. | G07G 1/0009 |
| 11,983,689 B2 * | 5/2024 | Maan | ................ | G06Q 20/40145 |
| 2002/0170782 A1 * | 11/2002 | Millikan | .............. | G07G 1/0054 186/61 |
| 2003/0006098 A1 * | 1/2003 | Wike, Jr. | ................ | A47F 9/046 186/61 |
| 2003/0150911 A1 * | 8/2003 | Joseph | ................. | G06Q 20/206 235/382 |
| 2003/0171966 A1 * | 9/2003 | Goodwin, III | ......... | G06Q 10/02 705/7.21 |
| 2003/0217892 A1 | 11/2003 | Persky | | |

(Continued)

FOREIGN PATENT DOCUMENTS

| | | | | |
|---|---|---|---|---|
| CA | 2763886 A1 * | 4/2012 | ........... | G07G 1/0045 |
| CN | 207337565 U * | 5/2018 | | |

(Continued)

OTHER PUBLICATIONS

Self-Checkout Loss: Increasing Participation and Scan Accuracy Through Design, Oct. 2020.
U.S. Appl. No. 17/986,978, filed Nov. 15, 2022.

*Primary Examiner* — Ashford S Hayles
(74) *Attorney, Agent, or Firm* — Patterson + Sheridan, LLP; Gero G. McClellan (57) ABSTRACT

Techniques to reconfigure self-checkout kiosks based on attendant availability. A first transaction is processed based on an indication of current availability, at a first point in time, of one or more attendants for a physical area associated with a self-checkout kiosk. After processing the first transaction, an indication of current availability, at a second point in time, of the one or more attendants is determined. A second transaction is processed based on the indication of current availability, at the second point in time, of the one or more attendants.

14 Claims, 6 Drawing Sheets

(56) References Cited

U.S. PATENT DOCUMENTS

| | | | | |
|---|---|---|---|---|
| 2005/0206501 | A1* | 9/2005 | Farhat | G07C 9/257 340/5.82 |
| 2007/0033111 | A1* | 2/2007 | Mandalia | G06Q 10/06314 705/7.24 |
| 2007/0033382 | A1* | 2/2007 | Mandalia | G06F 9/44505 712/23 |
| 2007/0235531 | A1* | 10/2007 | Addison | A47F 9/04 235/383 |
| 2009/0076922 | A1* | 3/2009 | de Gruil | G06Q 20/20 705/16 |
| 2009/0198582 | A1* | 8/2009 | Tokorotani | G06Q 20/208 705/17 |
| 2012/0197741 | A1 | 8/2012 | Carlegren et al. | |
| 2013/0024304 | A1* | 1/2013 | Doi | G07G 1/0036 705/16 |
| 2013/0153656 | A1* | 6/2013 | Skiles | G07G 1/009 705/16 |
| 2014/0058946 | A1* | 2/2014 | Paranjape | G06Q 20/208 705/44 |
| 2014/0172607 | A1* | 6/2014 | Skiles | G01G 19/4144 705/16 |
| 2014/0207505 | A1* | 7/2014 | Ashley | G06Q 10/06311 705/7.14 |
| 2015/0127401 | A1* | 5/2015 | Hogg | G06Q 30/0281 705/7.15 |
| 2015/0127431 | A1* | 5/2015 | Thomas | G06Q 10/06393 705/7.39 |
| 2015/0170499 | A1* | 6/2015 | Bower | H04W 4/70 340/686.6 |
| 2016/0026985 | A1* | 1/2016 | Dubois | G06Q 20/18 705/16 |
| 2016/0171566 | A1* | 6/2016 | Pugh | G06Q 30/0281 705/346 |
| 2016/0379145 | A1* | 12/2016 | Valentino, III | G06V 20/40 705/7.13 |
| 2017/0083850 | A1* | 3/2017 | Crow | G06F 16/2477 |
| 2018/0075427 | A1* | 3/2018 | Greenberger | G06Q 20/389 |
| 2019/0005480 | A1* | 1/2019 | Jung | G06F 21/629 |
| 2020/0380489 | A1* | 12/2020 | Saitoh | G06Q 20/405 |
| 2021/0073770 | A1* | 3/2021 | Gordon | G06Q 20/206 |
| 2021/0241249 | A1* | 8/2021 | DeBardlebon | G06V 20/52 |
| 2021/0306473 | A1* | 9/2021 | Inouye | H04N 1/00307 |
| 2021/0375104 | A1* | 12/2021 | Handshaw | G06Q 20/204 |
| 2023/0068255 | A1* | 3/2023 | Laserson | G06Q 20/18 |
| 2023/0316254 | A1* | 10/2023 | Maan | G06Q 30/015 705/18 |
| 2023/0316847 | A1* | 10/2023 | Khatter | G07F 9/001 700/231 |

FOREIGN PATENT DOCUMENTS

| | | | | | |
|---|---|---|---|---|---|
| JP | | 2000020833 | A | * | 1/2000 |
| JP | | 2001076261 | A | * | 3/2001 |
| JP | | 3916323 | B2 | * | 5/2007 |
| JP | | 4482710 | B2 | * | 6/2010 ........ G07G 1/0018 |
| WO | WO-2013125741 | A1 | * | 8/2013 ........ G06Q 10/06 |

* cited by examiner

RECONFIGURING SELF-CHECKOUT KIOSKS BASED ON ATTENDANT AVAILABILITY

BACKGROUND

Embodiments presented in this disclosure relate to self-checkout kiosks. More specifically, embodiments disclosed herein relate to techniques to reconfigure self-checkout kiosks based on attendant availability.

Self-checkout kiosks are an increasingly popular way to manage Point-of-Sale (POS) transactions in retail environments. Individuals using such kiosks are responsible for scanning, packing, and completing the transaction themselves. This allows the individuals greater control over the exchange than at traditional terminals staffed by checkout personnel such as cashiers and/or baggers.

DETAILED DESCRIPTION

Embodiments presented in this disclosure provide techniques to reconfigure self-checkout kiosks based on attendant availability. One embodiment includes an application that processes a first transaction based on an indication of current availability, at a first point in time, of one or more attendants for a physical area associated with a self-checkout kiosk. After processing the first transaction, the application determines an indication of current availability, at a second point in time, of the one or more attendants. The application then processes a second transaction based on the indication of current availability, at the second point in time, of the one or more attendants.

Advantages of Reconfiguring Self-Checkout Kiosks Based on Attendant Availability By reconfiguring self-checkout kiosks based on attendant availability using the techniques disclosed herein, self-checkout kiosks can be reconfigured to dynamically adapt to changes to attendant availability overtime. For instance, the self-checkout kiosks can be reconfigured to exhibit relatively greater checkout leniency and/or checkout speed, when a relatively lower measure of current attendant availability is detected. Doing so can reduce incidence of the self-checkout kiosks, at inopportune moments, halting a current transaction and requiring attendant action before the current transaction is permitted to proceed. In particular, the incidence can be reduced when attendant availability is already detected as being relatively lower. This can preemptively avoid scenarios in which a current transaction is halted even though no attendant is presently available to review and unhalt the current transaction.

Additionally or alternatively, in some embodiments, the self-checkout kiosks can be reconfigured to exhibit relatively lesser checkout leniency and/or checkout speed, when a relatively higher measure of current attendant availability is detected. Doing so can increase incidence of the self-checkout kiosks, at opportune moments, halting a current transaction and requiring attendant action. In particular, the incidence can be increased when attendant availability is already detected as being relatively higher. At least in some cases, the higher attendant availability can support greater checkout security without substantially impairing checkout speed. This can preemptively avoid scenarios in which erroneous or fraudulent transactions are approved under a default measure of security, even though attendants are presently available to review the transactions under an increased measure of security.

Advantageously, by configuring the self-checkout kiosks to adapt to changes to attendant availability over time, a desired tradeoff between checkout speed and checkout security can be dynamically maintained even when such changes occur. In contrast, absent the techniques disclosed herein, the self-checkout kiosks may not be able to adapt to changes to attendant availability over time, and when such changes occur, the desired tradeoff can fail to be maintained.

Figure 1:
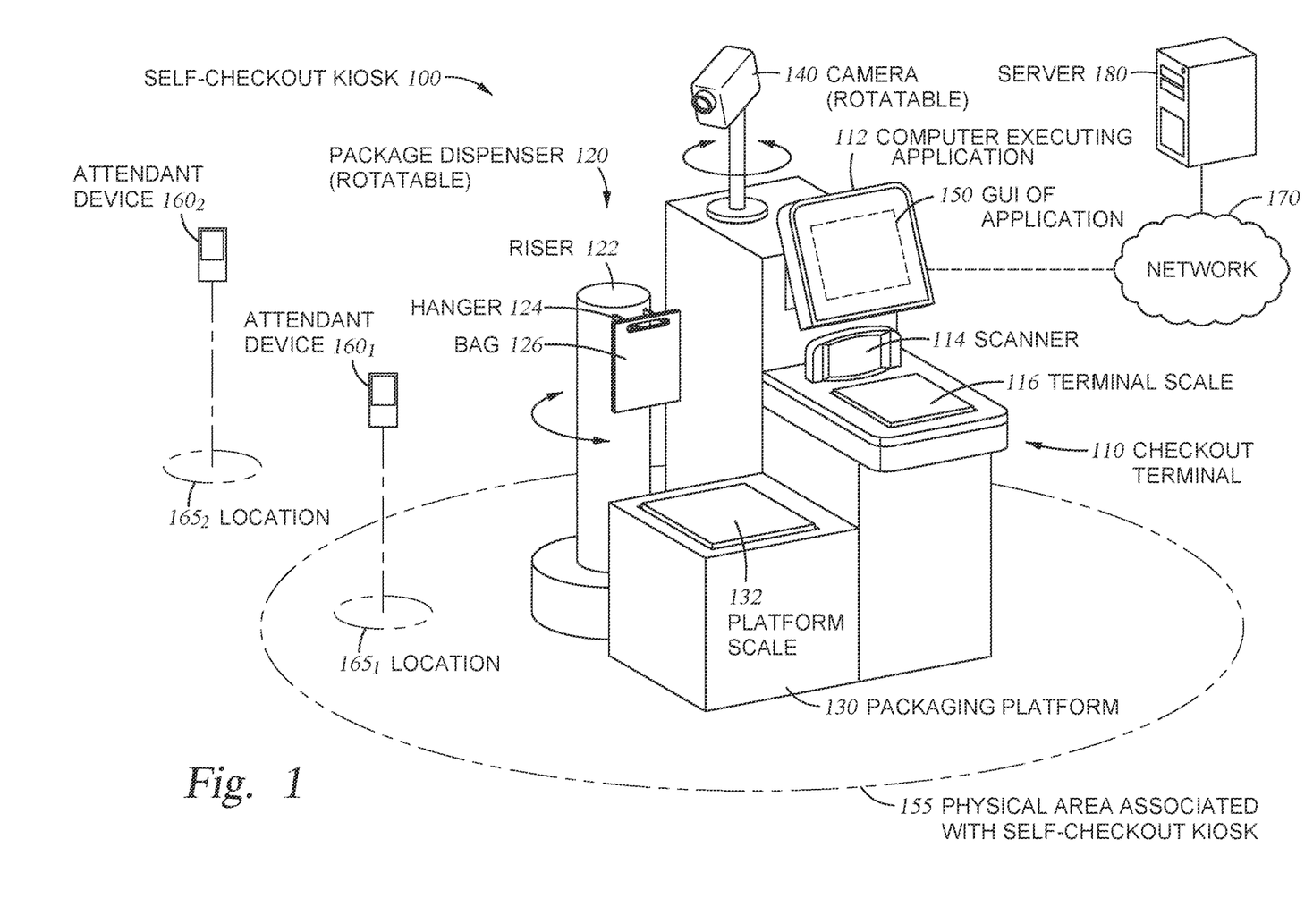
FIG. 1 illustrates a self-checkout kiosk that is reconfigurable based on attendant availability, according to one embodiment presented in this disclosure.

FIG. 1 illustrates a self-checkout kiosk 100 that is reconfigurable based on attendant availability, according to one embodiment. As shown, the self-checkout kiosk 100 includes a checkout terminal 110, a package dispenser 120, and a packaging platform 130. The self-checkout kiosk 100 includes a camera 140 that is disposed atop a rear section of the checkout terminal 110. The camera 140 can have a field of view that includes the checkout terminal 110, the package dispenser 120, and/or the packaging platform 130. In some embodiments, the field of view of the camera 140 is adjustable over time, such as by rotating the camera 140 about one or more axes associated with the camera 140. In some embodiments, multiple cameras, including the camera 140, can be included in the self-checkout kiosk 100. Depending on the embodiment, the camera(s) can be part of the checkout terminal 110, the package dispenser 120, and/or packaging platform 130.

In one embodiment, the checkout terminal 110 includes a computer 112, a scanner 114, and a terminal scale 116. As shown, the scanner 114 is included in the rear section of the checkout terminal 110, while the terminal scale 116 is included in a front section of the checkout terminal 110. The computer 112 includes a display and various controls to permit a user to view a current transaction and provide input to the checkout terminal 110 for how to proceed. The controls can include a touch screen, a signature pad, buttons, a chip reader, and/or the like. The computer 112 executes an application configured to perform the techniques disclosed herein. The application can generate one or more graphical user interface (GUI) screens for output via the display, where the one or more GUI screens include the GUI 150.

The computer 112 can also be operatively connected to other computers via a network 170, according to one embodiment. As shown, the other computers include a server 180 and attendant devices $160_{1-2}$ of attendants. Each attendant device can generally include any computing device configured for use by an attendant to cause attendant-related operations to be performed on the computing device.

In certain embodiments, the attendant device can be a smartphone that executes an attendant application, or a dedicated, non-smartphone device. In certain embodiments, some or all of the functionality of the application can be performed by the server 180. The application processes a first transaction based on an indication of current availability, at a first point in time, of one or more attendants for a physical area associated with a self-checkout kiosk.

In one embodiment, after processing the first transaction, the application determines an indication of current availability, at a second point in time, of the one or more attendants. The application processes a second transaction based on the indication of current availability, at the second point in time, of the one or more attendants. At least in some embodiments, the application automatically takes into account the indication of current availability. In this regard, the indication of current availability is taken into account without requiring user intervention by an attendant or an administrative user.

The indication of current availability can be determined based at least in part on location data provided by the attendant devices $160_{1-2}$, according to one embodiment. The location data can characterize real-time locations of the attendant devices $160_{1-2}$ in a physical retail establishment. In a particular embodiment, the location data includes global positioning system (GPS) location data determined by a respective GPS component of each of the attendant devices $160_{1-2}$, where the GPS component includes a GPS receiver. Depending on the embodiment, the attendant devices $160_{1-2}$ can send the location data to the computer 112 and/or the server 180 via the network 170.

In one embodiment, based on the location data, the application can determine a count of attendant devices that are present within a physical area 155 associated with the self-checkout kiosk 100. Although the physical area 155 is depicted as having a circular shape that encompasses the self-checkout kiosk and that is substantially thereon, the specific shape and/or location of the physical area 155 can be tailored to suit the needs of a particular case.

Depending on the embodiment, the count can be provided as-is or as part of a ratio of the count to a total count of all attendant devices—i.e., attendant devices regardless of whether the attendant devices are within the physical area 155. For instance, the attendant device 160₁ is determined as being at a location 165₁ that is within the physical area 155. In contrast, the attendant device 160₂ is determined as being at a location 165₂ that is external to the physical area 155. In this particular example, the count of attendant devices that are present within the physical area 155 is one, and the ratio of the count to the total count is 1:2.

In some embodiments, as an alternative to determining the count or ratio, the application can determine a respective distance, of each of the attendant devices $160_{1-2}$, from the self-checkout kiosk, the physical area 155, or a location associated with one of the self-checkout kiosk and the physical area 155. In this regard, greater distances represent lesser availability. The indication of current availability can then be determined based at least in part on the count, the ratio, or the distances.

In some embodiments, processing the second transaction based on the indication of current availability includes updating a setting based on the indication and then processing the second transaction based on the updated setting. In alternative embodiments, no setting is updated, and the second transaction is processed based on the indication directly. Depending on the embodiment, the setting can be of the application, the computer 112, or the self-checkout kiosk 100. In addition, the setting pertains to a specified type of security check, in some embodiments. For instance, the setting can control a margin of error that is deemed permissible for the specified type of security check. In alternative embodiments, the setting does not pertain to any specific type of security check. By configuring the self-checkout kiosks to adapt to changes to attendant availability over time, a desired tradeoff between checkout speed and checkout security can be dynamically maintained even when such changes occur.

In one embodiment, the scanner 114 identifies various items that are part of the current transaction, where the various items can be identified via a bar code and/or image recognition software. The terminal scale 116 measures a weight of any items placed on the terminal scale 116, where the items can be produce in a grocery environment, for instance. Depending on the embodiment, the weight of an item can be determined by measuring the weight of the item when the item is placed on the terminal scale 116 and/or by querying a table or database to retrieve a specified weight of the item. The checkout terminal 110 can be in wired or wireless communication with the package dispenser 120, the packaging platform 130, the camera 140, one or more attendant kiosks, one or more other self-checkout kiosks, a backend database, and/or other devices in a retail environment, e.g., a user phone for near-field communication.

The packaging platform 130 provides one or more types of packaging to one or more checkout terminals, according to one embodiment. The packaging is provided for selection for packing goods as part of the current transaction. The packaging platform 130 includes a platform scale 132 that measures a weight of items placed on the platform scale 132. The items can include various goods included in the current transaction, packages for those goods, such as the bag 126, and/or various goods that are not included in the current transaction but that a user nevertheless placed, either intentionally or inadvertently, in the packing area. The packaging platform 130 reports the weight measured by the platform scale 132 to the checkout terminal 110.

In one embodiment, the package dispenser 120 is of a carousel type and includes a riser 122 that provides a hanger 124. In some embodiments, the hanger 124 can runs for a specified distance from the riser 122 to end at a catch distal to an attachment point of the hanger 124 to the riser 122. The catch prevents the bag 126 from falling off of the hanger 124, such as when the hanger 124 is at an acute angle relative to the riser 122. The riser 122 is selectively rotatable around a vertical axis of the riser 122 to a variety of rotational positions. Each rotational position can present certain bags into the reach of the user while placing other bags out of reach of the user. For instance, although the riser 122 is shown as being rotated to present the bag 126 to the user, the riser 122 can be further rotated to present other bags (not shown) to the user while moving the bag 126 out of reach of the user.

Figure 2:
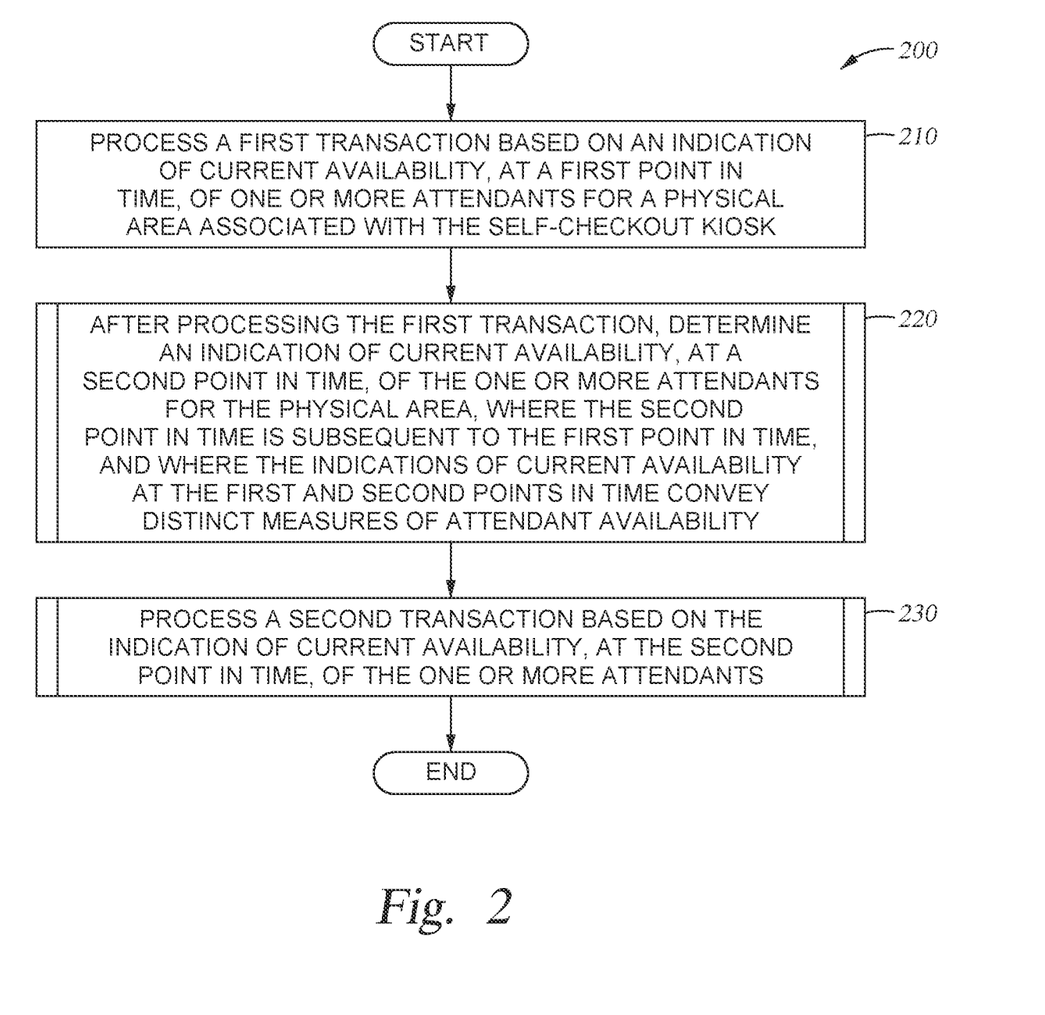
FIG. 2 is a flowchart depicting a method to reconfigure the self-checkout kiosk based on attendant availability, according to one embodiment presented in this disclosure.

FIG. 2 is a flowchart depicting a method 200 to reconfigure the self-checkout kiosk based on attendant availability, according to one embodiment. The method 200 can be performed by the application executing on the computer 112 of FIG. 1. As shown, the method 200 begins at step 210, where the application processes a first transaction based on an indication of current availability, at a first point in time, of one or more attendants for a physical area associated with the self-checkout kiosk.

After processing the first transaction, the application 150 at step 220 determines an indication of current availability, at a second point in time, of the one or more attendants for the physical area, according to one embodiment. The second point in time is subsequent to the first point in time. Further, the indications of current availability at the first and second points in time convey distinct measures of attendant availability. The step 220 is further described in conjunction with FIG. 3. At step 230, the application processes a second transaction based on the indication of current availability, at the second point in time, of the one or more attendants. The step 230 is further described in conjunction with FIGS. 4A-4B. After the step 230, the method 200 terminates.

Figure 3:
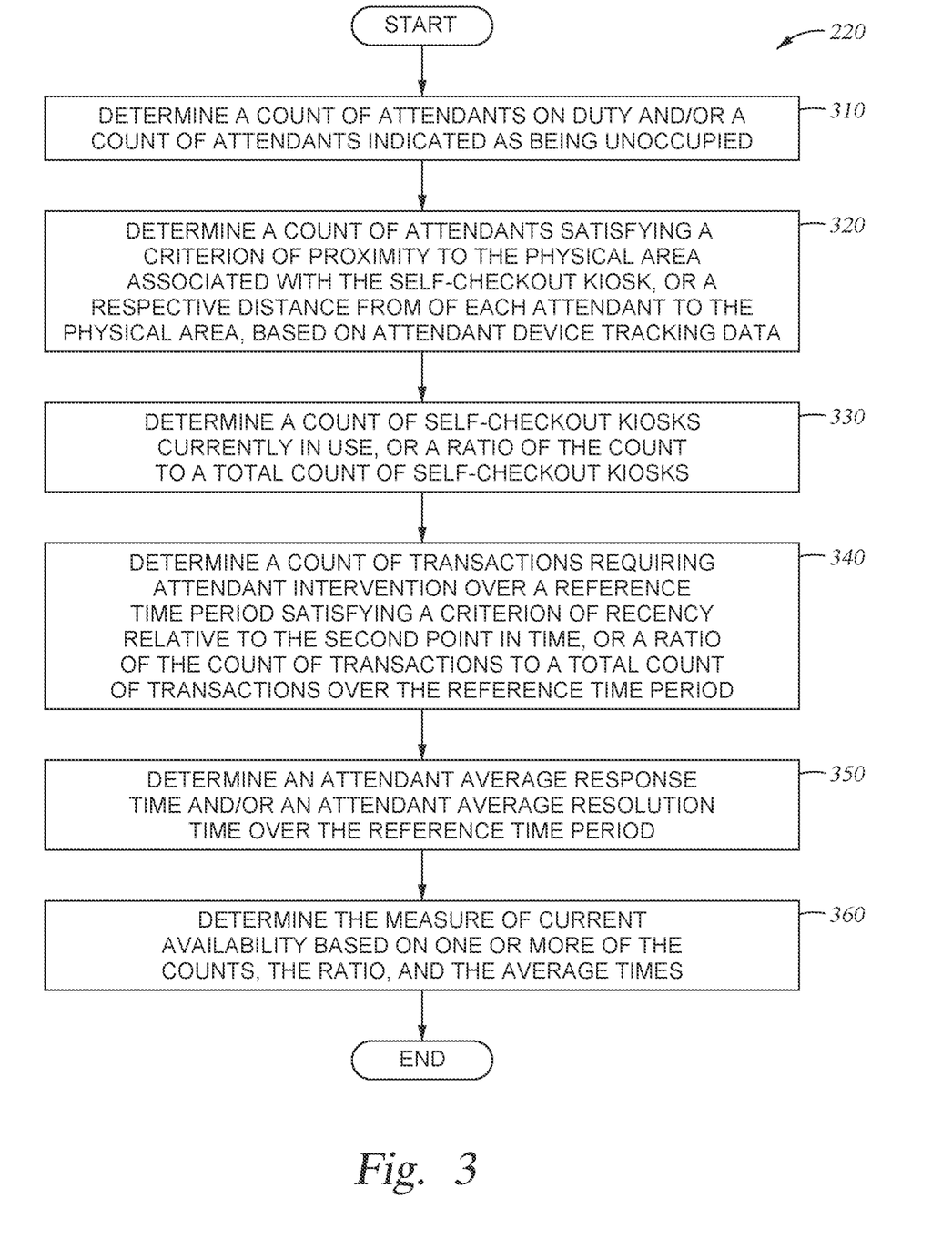
FIG. 3 is a flowchart depicting a method to determine the attendant availability for reconfiguring the self-checkout kiosk, according to one embodiment presented in this disclosure.

FIG. 3 is a flowchart depicting a method to determine the attendant availability for reconfiguring the self-checkout kiosk, according to one embodiment. The method can correspond to the step 220 of FIG. 2. Further, the method can be performed by the application executing on the computer 112 of FIG. 1. As shown, the method begins at step 310, where the application determines a count of attendants on duty and/or a count of attendants indicated as being unoccupied. Indications of being unoccupied or occupied can be manually specified by the attendants via the attendant devices, in some embodiments.

At step 320, the application determines, based on attendant device tracking data, a count of attendants satisfying a criterion of proximity to the physical area associated with the self-checkout kiosk. For instance, the criterion of proximity can specify for attendant devices to be within fifteen feet of the physical checkout area or, alternatively, of the self-checkout kiosk, for the criterion to be satisfied. Alternatively, the application at the step 320 determines, based on the attendant device tracking data, a respective distance of each attendant to the physical area.

At step 330, the application determines a count of self-checkout kiosks currently in use or a ratio of the count to a total count of self-checkout kiosks. A higher count or ratio of self-checkout kiosks currently in use is correlated with decreases in attendant availability due to the in-use self-checkout kiosks requesting attendant intervention, at least in some cases.

At step 340, the application determines a count of transactions requiring attendant intervention over a reference time period, according to one embodiment. Alternatively, the application at the step 340 determines a ratio of the count of transactions to a total count of transactions over the reference time period. The reference time period can be a time period that satisfies a criterion of recency relative to the second point in time. For instance, the criterion of recency can specify for the time period to be in the past thirty minutes.

At step 350, the application determines an attendant average response time over the reference time period, according to one embodiment. The attendant average response time conveys an amount of time that has elapsed before an attendant initiates review of a current transaction. The attendant average response time can be determined based on logged data indicating the respective attendant response time for each transaction for which attendant intervention was required. Additionally or alternatively, the application at the step 350 determines an attendant average resolution time over the reference time period. The attendant average resolution time can be determined based on logged data indicating the respective attendant resolution time for each transaction for which attendant intervention was required.

Depending on the embodiment, the attendant average response time and/or the attendant average resolution time can pertain to a particular attendant or to a group of attendants based on a group selection criterion (e.g., being on duty, proximate, and/or unoccupied). In a particular embodiment, the attendant average response time and/or the attendant average resolution time pertains to all attendants recognized in the computing environment.

At step 360, the application determines the measure of current availability based on one or more input values, the input values including the counts, the ratio, and the average times, according to one embodiment. The measure of current availability is not specific to any particular attendant but represents an overall measure of attendant availability, at least in some embodiments. The measure of current availability can be represented as a number on a predefined scale of numbers, where the numbers can be integers or real numbers.

In some embodiments, in determining the measure of current availability, each of the one or more input values can be weighted or unweighted, and each input value can have a respective, associated weight. The weight associated with a given input value can be have a same value or a distinct value relative to the weight associated with another input value. Different weightings can be set to favor one measure of attendant availability over another, e.g., average attendant response time over ratio of unoccupied attendants, or vice versa, depending on the embodiment.

Alternatively, an intermediate measure of current availability is computed in the same manner as the measure of current availability described above, and a (final) measure of current availability is represented as a label selected from a predefined set of labels (e.g., "low," "medium," and "high"). The label can be selected based on a predefined mapping from different sub-ranges of values of the intermediate measure, to the labels. Still alternatively, the measure of current availability is represented as a label selected from a predefined set of labels, where the label is selected based on a predefined mapping from different sub-ranges of values of one of the input values, to the labels; no intermediate measure is required to be computed in such an instance.

As an example, in one embodiment, the application can determine that the measure of current availability is "high" upon determining that three or more attendants are proximate to the physical area of the self-checkout kiosk. Alternatively, the measure of current availability can be determined as being "medium" upon determining that only one or two attendants are proximate to the physical area. Still alternatively, the measure of current availability can be determined as being "low" upon determining that no attendants are proximate to the physical area. In alternative embodiments, other measures, such as average attendant response time and/or average attendant resolution time, can be used in lieu of or in conjunction with the count of proximate attendants, to determine the measure of current availability.

After the step 360, the method terminates. As described above, in some embodiments, some or all of the functionality of the application can be performed by the server. For instance, in an alternative embodiment, the step 220 is performed by the server, while the steps 210 and 230 are performed by the application. In such an embodiment, the server sends the indications of current availability to the application via the network.

Figure 4A:
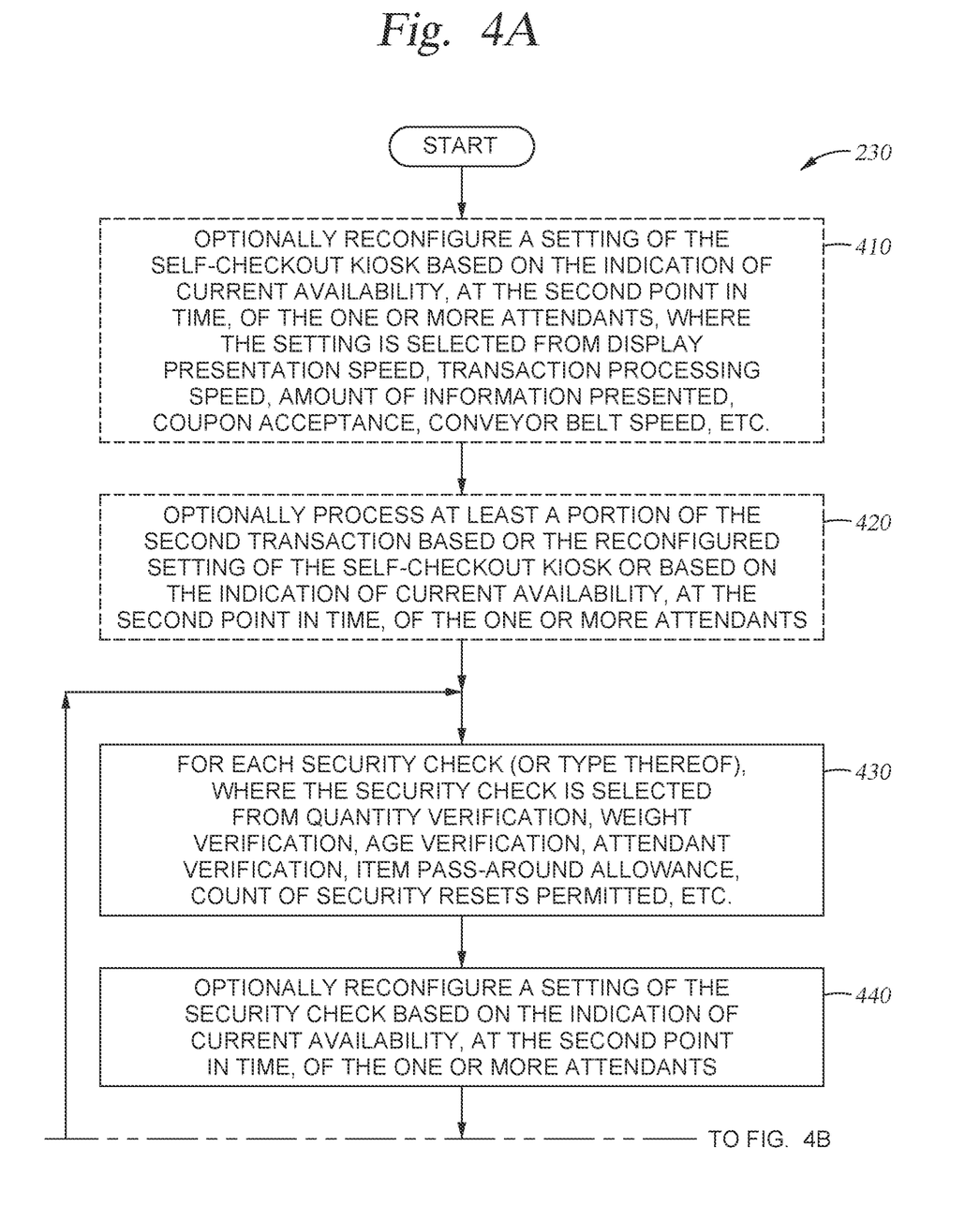
FIGS. 4A-4B are a flowchart depicting a method to process a transaction at the self-checkout kiosk based on the attendant availability, according to one embodiment presented in this disclosure.
Figure 4B:
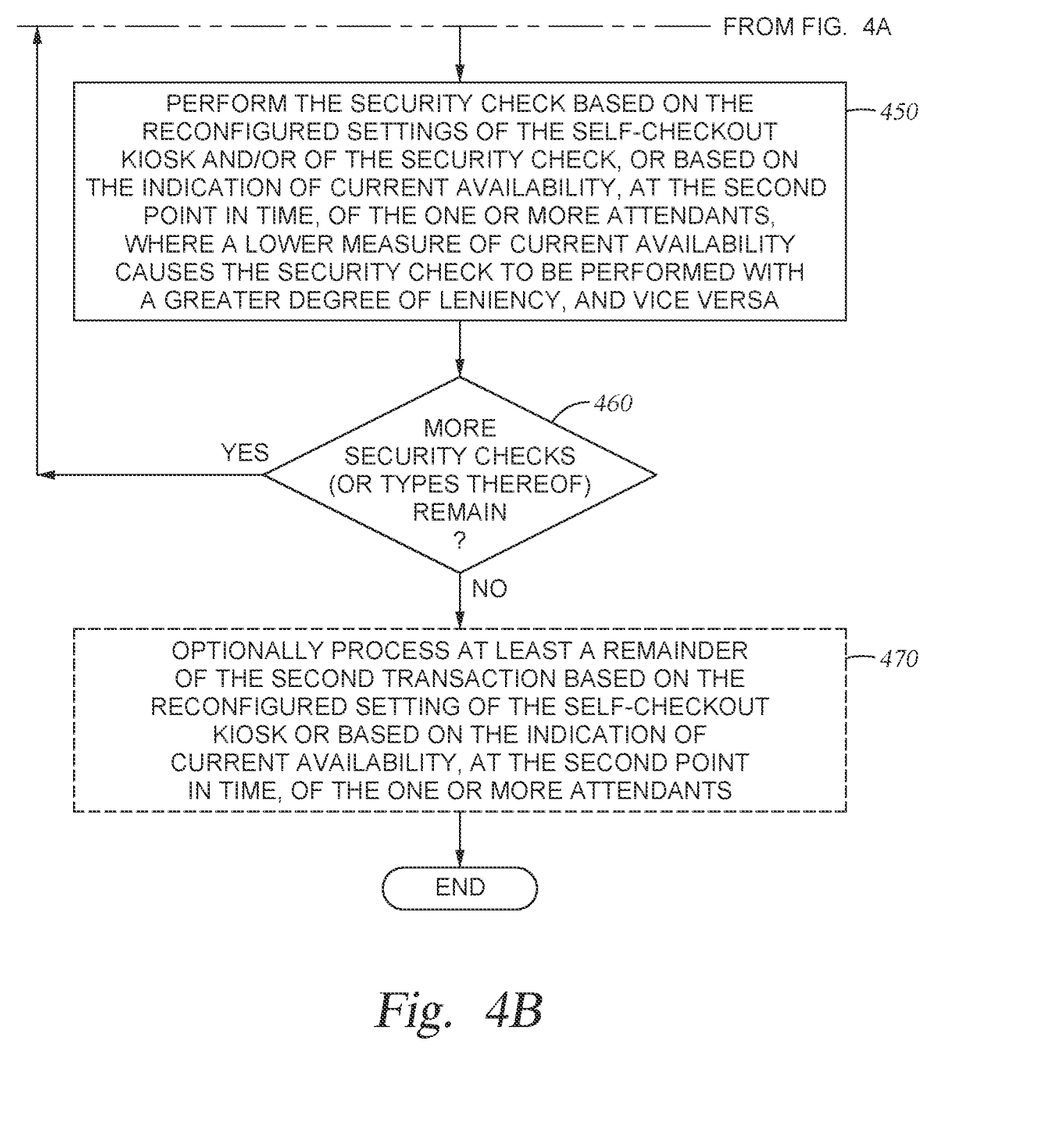

FIGS. 4A-4B are a flowchart depicting a method 400 to process a transaction at the self-checkout kiosk based on the attendant availability, according to one embodiment. The method can correspond to the step 230 of FIG. 2. Depending on the embodiment, the method can be performed by the application executing on the computer 112 and/or by the server 180 of FIG. 1. As shown in FIG. 4A, the method begins at step 410, where the application optionally reconfigures a setting of the self-checkout kiosk based on the indication of current availability, at the second point in time, of the one or more attendants. In some embodiments, the setting can be selected from display presentation speed, transaction processing speed, amount of information presented, coupon acceptance, conveyor belt speed, and so forth.

In some embodiments, the application sets values for the setting based on determined values for current availability. The values can be set without regard to any increase or decrease in current availability. In alternative embodiments, the application increases or decreases the setting based on a determined increase or decrease in current availability. To further describe the latter, in such embodiments, the application can cause the setting to become more lenient relative to its prior setting in terms of transaction security, upon determining that the indication of current availability reflects a decrease in availability of the one or more attendants since a last time the current availability was ascertained. On the other hand, in such embodiments, the application can cause the setting to become stricter relative to its prior setting in terms of transaction security, upon determining that the indication of current availability reflects an increase in availability of the one or more attendants since the last time the current availability was ascertained.

At step 420, the application optionally processes at least a portion of the second transaction based on the reconfigured setting of the self-checkout kiosk, according to one embodiment. Alternatively, the application at the step 420 processes at least the portion of the second transaction based on the indication of current availability, at the second point in time, of the one or more attendants. In either case, the application at the step 420 can, for instance, generate and output one or more GUI screens (e.g., a welcome screen) prompting an end-user to confirm a desire to initiate a current transaction. At least in some embodiments, the step 420 does not involve any type of security check. At step 430, the application enters a loop to process each security check or type of security check. In some embodiments, the security check can be selected from quantity verification, weight verification, age verification, attendant verification, item pass-around allowance, count of security resets permitted, and so on.

At step 440, the application optionally reconfigures a setting of the security check based on the indication of current availability, at the second point in time, of the one or more attendants, according to one embodiment. Reconfiguring the setting can be optional in embodiments where the permissible values for the setting are effectively embedded or coded in logic of the security check rather than being standalone, configurable data. Turning to FIG. 4B, at step 450, the application performs the security check based on the reconfigured settings of the self-checkout kiosk. In some embodiments, the security check can be performed based alternatively or additionally on the indication of current availability, at the second point in time, of the one or more attendants.

At least in some embodiments, a lower measure of current availability causes the security check to be performed with a greater degree of leniency, and vice versa. As noted above, two example types of security checks include quantity verification and weight verification. At least in some embodiments, both item verification and weight verification can be performed on the same item or items. In other embodiments, only item verification is performed on certain items, while only weight verification is performed on other items. In some embodiments, each type of security check can have its own associated error margin. In an alternative embodiment, multiple security checks can share the same associated error margin.

For example, a medium current availability can cause a permissible error margin for a quantity verification based on computer vision to be five percent in terms of a quantity of a given item or items. In this regard, if a user has scanned twenty candy bars, the application can determine that quantity verification has passed even if the application identifies, using computer vision, twenty-one candy bars as being present in the current transaction. On the other hand, the application can determine that quantity verification has failed if the application identifies twenty-two candy bars as being present in the current transaction. A high current availability can cause the permissible error margin to be two percent. A low current availability can cause the permissible error margin to be eight percent. The number of measures of current availability and the associated permissible error margins can be tailored to suit the needs of a particular case. Further, depending on the embodiment, the error margin can apply to quantity verification for a specific item, for a specific type of item, or for all items regardless of type.

Additionally or alternatively, as another example, a medium current availability can cause a permissible error margin for a weight verification to be six percent in terms of a weight of a given item or items. In this regard, if a user has scanned a bag of dog food that is advertised as being five pounds in weight, the application can determine that weight verification has passed even if the application determines that the bag of dog food actually weighs 5.3 pounds. On the other hand, the application can determine that weight verification has failed if the application determines that the bag of dog food actually weighs 5.4 pounds. A high current availability can cause the permissible error margin to be three percent. A low current availability can cause the permissible error margin to be six percent. The number of measures of current availability and the associated permissible error margins can be tailored to suit the needs of a particular case. Further, depending on the embodiment, the error margin can apply to weight verification for a specific item, for a specific type of item, or for all items regardless of type.

At step 460, the application determines whether any additional security check or type of security check remains to be processed, according to one embodiment. If so, the method returns to the step 430 to process the additional security check or type of security check. Otherwise, the method proceeds to step 470, where the application optionally processes at least a remainder of the second transaction based on the reconfigured setting of the self-checkout kiosk. Alternatively, the application at the step 470 optionally processes at least the remainder of the second transaction based on the indication of current availability, at the second point in time, of the one or more attendants. In this regard, the remainder is relative to the portion, of the second transaction, from the step 420, in one embodiment. In either case, the application at the step 470 can, for instance, generate and output one or more GUI screens prompting an end-user to confirm or conclude the current transaction, according to one embodiment. At least in some embodiments, the step 470 does not involve any type of security check. After the step 470, the method 400 terminates.

Figure 5:
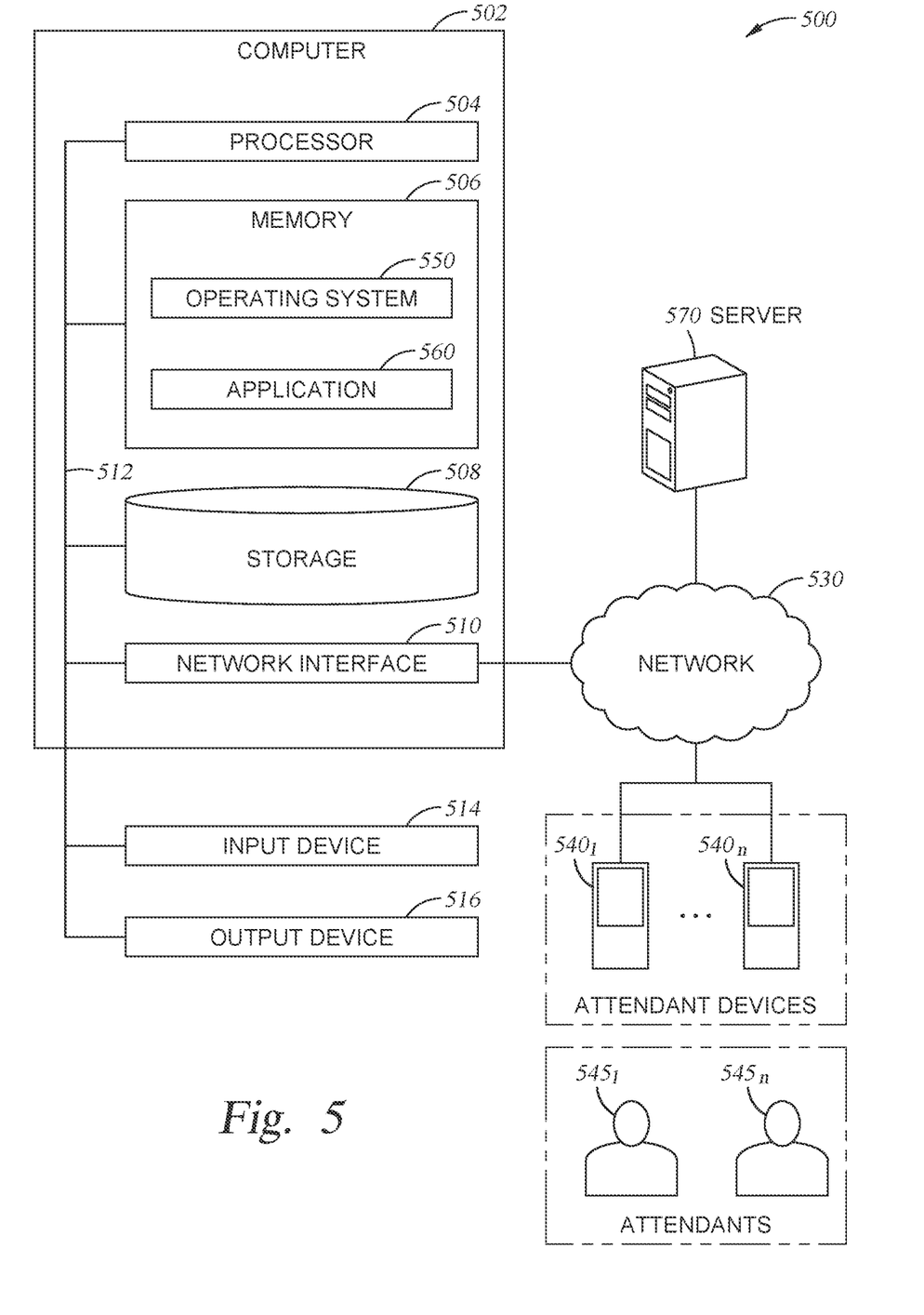
FIG. 5 is a block diagram illustrating components of a computing environment for self-checkout reconfiguration based on attendant availability, according to one embodiment presented in this disclosure.

FIG. 5 is a block diagram illustrating components of a computing environment 500 for self-checkout reconfiguration based on attendant availability, according to one embodiment. The computing environment 500 includes a computer 502 configured to connect to other computers via a network 530. As shown, the other computers include a server 570 and attendant devices $540_{1-n}$ of attendants $545_{1-n}$. In general, the network 530 can be a telecommunications network and/or a wide area network (WAN). In a particular embodiment, the network 530 is the Internet.

The computer 502 generally includes a processor 504 connected via a bus 512 to a memory 506, a network interface device 510, a storage 508, an input device 514, and an output device 516. The computer 502 is generally under the control of an operating system. Examples of operating systems include UNIX, versions of the Microsoft Windows® operating system, and distributions of the Linux® operating system. More generally, any operating system supporting the functions disclosed herein can be used.

The processor 504 is included to be representative of a single CPU, multiple CPUs, a single CPU having multiple processing cores, and the like. Similarly, the memory 506 can be a random access memory. While the memory 506 is shown as a single identity, it should be understood that the memory 506 can comprise a plurality of modules, and that the memory 506 can exist at multiple levels, from high speed registers and caches to lower speed but larger DRAM chips. The network interface device 510 can be any type of network communications device allowing the computer 502 to communicate with the other computers via the network 530.

The storage 508 can be a persistent storage device. Although the storage 508 is shown as a single unit, the storage 508 may be a combination of fixed and/or removable storage devices, such as fixed disc drives, solid state drives, floppy disc drives, tape drives, removable memory cards or optical storage. The memory 506 and the storage 508 may be part of one virtual address space spanning multiple primary and secondary storage devices.

The input device 514 can be any device for providing input to the computer 502. For example, a keyboard and/or a mouse may be used. The output device 516 may be any device for providing output to a user of the computer 502. For example, the output device 516 may be any conventional display screen or set of speakers. Although shown separately from the input device 514, the output device 516 and input device 514 may be combined. For example, a display screen with an integrated touch-screen may be used.

As shown, the memory 506 of the computer 502 includes an operating system 550 providing an execution environment in which an application 560 can execute. In some embodiments, the application 560 can correspond to the application executing on the computer 112 of FIG. 1. By configuring the self-checkout kiosks to adapt to changes to attendant availability over time, a desired tradeoff between checkout speed and checkout security can be dynamically maintained even when such changes occur.

The descriptions of the various embodiments in the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects in the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Aspects in the present disclosure may be a system, a method, and/or a computer program product. The computer program product may include a computer readable storage medium (or media) having computer readable program instructions thereon for causing a processor to carry out aspects in the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations in the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects in the present disclosure.

Aspects in the present disclosure are described herein with reference to flowchart illustrations and/or block diagrams of methods, apparatus (systems), and computer program products according to embodiments in the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments in the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments in the present disclosure, other and further embodiments may be devised without departing from the basic scope thereof, and the scope thereof is determined by the claims that follow.

What is claimed is:

1. A computer-implemented method comprising:
   processing a first transaction based on an indication of current availability, at a first point in time, of one or more attendants for a physical area associated with a self-checkout kiosk, wherein the first transaction is processed based on a setting of the self-checkout kiosk, wherein the setting is configured based on the indication of current availability, at the first point in time, of the one or more attendants, and wherein the setting is configured without requiring intervention;
   after processing the first transaction, determining an indication of current availability, at a second point in time, of the one or more attendants;
   reconfiguring the setting of the self-checkout kiosk based on the indication of current availability, at the second point in time, of the one or more attendants, and wherein the setting is reconfigured without requiring intervention; and
   processing a second transaction by operation of one or more computer processors based on the indication of current availability, at the second point in time, of the one or more attendants, wherein the second transaction is processed based on the reconfigured setting.

2. The computer-implemented method of claim 1, wherein the current availability is determined based on at least one of (i) a count based on any of the one or more attendants and (ii) a proximity of any of the one or more attendants to the physical area.

3. The computer-implemented method of claim 1, wherein the setting is selected from display presentation speed, processing speed, amount of information presented, coupon acceptance, and conveyor belt speed.

4. The computer-implemented method of claim 1, wherein reconfiguring the setting comprises one of:
   causing the setting to become more lenient, in terms of transaction security, upon determining that the indication of current availability reflects a decrease in availability of the one or more attendants since a last time the current availability was ascertained, wherein the setting becomes more lenient relative to the setting prior to reconfiguration; and
   causing the setting to become stricter, in terms of transaction security, upon determining that the indication of current availability reflects an increase in availability of the one or more attendants since the last time the current availability was ascertained, wherein the setting becomes stricter relative to the setting prior to reconfiguration.

5. The computer-implemented method of claim 4, wherein the setting that is more lenient pertains to one or more types of security checks at the self-checkout kiosk, and wherein the setting that is more lenient causes a permissible margin of error of the one or more types of security checks to be increased.

6. The computer-implemented method of claim 1, wherein the indication of current availability is determined based on one or more criteria selected from:
   a count of attendants on duty;
   a count of attendants indicated as being unoccupied;
   a count of attendants satisfying a criterion of proximity to the physical area;
   a respective distance of each of the one or more attendants from the physical area; and
   a count of self-checkout kiosks currently in use.

7. The computer-implemented method of claim 1, wherein the indication of current availability is determined based on:
   a measure of transactions requiring attendant intervention over a reference time period satisfying a criterion of recency relative to a current point in time;
   an attendant average response time over the reference time period; and
   an attendant average resolution time over the reference time period.

8. The computer-implemented method of claim 1, wherein the setting is reconfigured in order to dynamically maintain, to a desired value or range of values, a tradeoff between checkout speed and checkout security notwithstanding changes in attendant availability over time; and
   wherein the first transaction is processed based on a setting of the self-checkout kiosk, wherein the setting is configured based on the indication of current availability, at the first point in time, of the one or more attendants, wherein the setting is configured without requiring intervention, and wherein the setting is selected from display presentation speed, processing speed, amount of information presented, coupon acceptance, and conveyor belt speed.

9. The computer-implemented method of claim 8, further comprising:
   reconfiguring the setting of the self-checkout kiosk based on the indication of current availability, at the second point in time, of the one or more attendants, wherein the setting is reconfigured without requiring intervention, wherein the second transaction is processed based on the reconfigured setting, and wherein reconfiguring the setting comprises one of:
   causing the setting to become more lenient, in terms of transaction security, upon determining that the indication of current availability reflects a decrease in availability of the one or more attendants since a last time the current availability was ascertained, wherein the setting becomes more lenient relative to the setting prior to reconfiguration; and
   causing the setting to become stricter, in terms of transaction security, upon determining that the indication of current availability reflects an increase in availability of the one or more attendants since the last time the current availability was ascertained, wherein the setting becomes stricter relative to the setting prior to reconfiguration.

10. The computer-implemented method of claim 9, wherein the setting that is more lenient pertains to one or more types of security checks at the self-checkout kiosk, wherein the setting that is more lenient causes a permissible margin of error of the one or more types of security checks to be increased, and wherein the indication of current availability is determined based on:
    a count of attendants on duty;
    a count of attendants indicated as being unoccupied;
    a count of attendants satisfying a criterion of proximity to the physical area;
    a respective distance of each of the one or more attendants from the physical area, wherein the respective distance is determined based on received data characterizing a real-time location of a device of the respective attendant;
    a count of self-checkout kiosks currently in use;
    a measure of transactions requiring attendant intervention over a reference time period satisfying a criterion of recency relative to a current point in time;
    an attendant average response time over the reference time period; and
    an attendant average resolution time over the reference time period.

11. A system comprising:
    one or more computer processors; and
    a memory containing a program executable by the one or more computer processors to perform an operation comprising:
    processing a first transaction based on an indication of current availability, at a first point in time, of one or more attendants for a physical area associated with a self-checkout kiosk, wherein the first transaction is processed based on a setting of the self-checkout kiosk, wherein the setting is configured based on the indication of current availability, at the first point in time, of the one or more attendants, and wherein the setting is configured without requiring intervention;
    after processing the first transaction, determining an indication of current availability, at a second point in time, of the one or more attendants;
    reconfiguring the setting of the self-checkout kiosk based on the indication of current availability, at the second point in time, of the one or more attendants, and wherein the setting is reconfigured without requiring intervention; and
    processing a second transaction based on the indication of current availability, at the second point in time, of the one or more attendants, wherein the second transaction is processed based on the reconfigured setting.

12. The system of claim 11, wherein the current availability is determined based on at least one of (i) a count based on any of the one or more attendants and (ii) a proximity of any of the one or more attendants to the physical area.

13. A non-transitory computer-readable medium containing a program executable to perform an operation comprising:
    processing a first transaction based on an indication of current availability, at a first point in time, of one or more attendants for a physical area associated with a self-checkout kiosk, wherein the first transaction is processed based on a setting of the self-checkout kiosk, wherein the setting is configured based on the indication of current availability, at the first point in time, of the one or more attendants, and wherein the setting is configured without requiring intervention;

after processing the first transaction, determining an indication of current availability, at a second point in time, of the one or more attendants;

reconfiguring the setting of the self-checkout kiosk based on the indication of current availability, at the second point in time, of the one or more attendants, and wherein the setting is reconfigured without requiring intervention; and processing a second transaction based on the indication of current availability, at the second point in time, of the one or more attendants, wherein the second transaction is processed by one or more computer processors when executing the program, wherein the second transaction is processed based on the reconfigured setting.

14. The non-transitory computer-readable medium of claim 13, wherein the current availability is determined based on at least one of (i) a count based on any of the one or more attendants and (ii) a proximity of any of the one or more attendants to the physical area.

* * * * *